*(12)* United States Patent
Lu

(10) Patent No.: US 9,712,052 B2
(45) Date of Patent: Jul. 18, 2017

(54) POWER SUPPLY APPARATUS WITH CABLE VOLTAGE DROP COMPENSATION

(71) Applicant: Acer Incorporated, New Taipei (TW)

(72) Inventor: Chi-Nan Lu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 14/809,268

(22) Filed: Jul. 26, 2015

(65) Prior Publication Data

US 2016/0357204 A1 Dec. 8, 2016

(30) Foreign Application Priority Data

Jun. 8, 2015 (TW) .............................. 104118512 A

(51) Int. Cl.
| | |
|---|---|
| *G05F 1/00* | (2006.01) |
| *H02M 3/156* | (2006.01) |
| *G05F 1/56* | (2006.01) |
| *G05F 1/565* | (2006.01) |

(52) U.S. Cl.
CPC ............. *H02M 3/156* (2013.01); *G05F 1/561* (2013.01); *G05F 1/565* (2013.01)

(58) Field of Classification Search
CPC  G01R 19/0084; H02M 3/1588; H02M 3/156; H02M 3/157; B23K 11/248; G05F 1/56
USPC ........ 323/234, 271, 282–285, 318, 349, 351
See application file for complete search history.

(56) References Cited

U.S. PATENT DOCUMENTS

| | | |
|---|---|---|
| 6,737,840 B2 | 5/2004 | McDonald et al. |
| 7,116,563 B2 | 10/2006 | Hua |
| 7,411,379 B2 | 8/2008 | Chu et al. |
| 8,686,701 B2 * | 4/2014 | Ting ...................... H02M 3/156 323/282 |
| 2006/0273740 A1 | 12/2006 | Saeueng et al. |
| 2009/0309558 A1 * | 12/2009 | Kielb ................. G05B 19/0423 323/234 |
| 2011/0101937 A1 * | 5/2011 | Dobkin ................. H02M 3/156 323/282 |
| 2012/0062195 A1 | 3/2012 | Ting |

(Continued)

FOREIGN PATENT DOCUMENTS

| | | |
|---|---|---|
| CN | 201503559 | 6/2010 |
| CN | 102067048 | 5/2011 |

(Continued)

*Primary Examiner* — Nguyen Tran
(74) *Attorney, Agent, or Firm* — Jianq Chyun IP Office

(57) ABSTRACT

A power supply apparatus is provided. The power supply apparatus includes a first power pin, a second power pin, a DC output regulator, a current sensing circuit, and a compensation circuit. The first and second power pins are coupled to an external load through a first wire and a second wire respectively. The DC output regulator receives an input voltage and a feedback voltage and generates an output voltage and an output current. The current sensing circuit senses the output current and generates a sensing voltage. The compensation circuit generates a compensation voltage responding to the sensing voltage. The compensation voltage is a sum of a voltage drop on the first wire and a voltage drop on the second wire. The compensation circuit compensates the output voltage according to the compensation voltage, such that a load voltage of the external load is kept at a stable voltage value.

11 Claims, 4 Drawing Sheets

(56) References Cited

U.S. PATENT DOCUMENTS

2013/0162226 A1\* 6/2013 Su ......................... H02M 3/156
                                                    323/234
2014/0145635 A1   5/2014 Chu

FOREIGN PATENT DOCUMENTS

| KR | 20120048876 | 5/2012 |
| TW | 200625746   | 7/2006 |
| TW | 201106598   | 2/2011 |
| TW | 201238251   | 9/2012 |
| TW | 201419719   | 5/2014 |

\* cited by examiner

POWER SUPPLY APPARATUS WITH CABLE VOLTAGE DROP COMPENSATION

CROSS-REFERENCE TO RELATED APPLICATION

This application claims the priority benefit of Taiwan application serial no. 104118512, filed on Jun. 8, 2015. The entirety of the above-mentioned patent application is hereby incorporated by reference herein and made a part of this specification.

BACKGROUND OF THE DISCLOSURE

Field of the Disclosure

The disclosure relates to a power supply apparatus, and relates particularly to a power supply apparatus with cable voltage drop compensation.

Description of Related Art

Typically, most power supply apparatuses are coupled to a load (for example, a cell phone, a table PC, a notebook computer, a portable power source and such electronic device) through a power cable, so as to supply power (or charge) to the load. However, a power cable itself usually has impedance. When the load increases such that the current passing through the power cables become large, the impedance of the circuit of the power cable itself or the plug of the power cable will generate a noticeable voltage drop. Because an output voltage provided by a power supply apparatus is typically a set value, therefore a load voltage transmitted to a load terminal through the power cable will drop with an increase in the current. In this way, whether an electronic device at the load terminal will operate normally (or charge) or not may be affected. Particularly, once the voltage drop generated on the power cable is too large such that the load voltage value received by the load terminal drops below a minimum operating voltage value that is allowable for the electronic device, then the electronic device at the load terminal will stop operating.

Therefore, in general applications, typically an additional sensing wire will be adopted to connect to the load terminal, so as to sense the load voltage of the load terminal. However, the additional sensing wire may reduce the reliability of the power cable and increase cost of the power cable. Therefore, under the premise of not adopting an additional sensing wire, how to lower the influence the voltage drop on the power cables has on the voltage at the load terminal such that the stability of the voltage at the load terminal may be enhanced is still an issue which a person skilled in the art is faced with.

SUMMARY OF THE DISCLOSURE

Accordingly, the exemplary embodiments of the disclosure provides a power supply apparatus with cable voltage drop compensation, in which an output current of the power supply apparatus is detected so as to generate a compensation voltage, and the output voltage of the power supply apparatus is compensated according to the compensation voltage, such that the stability of the voltage of the load terminal is enhanced.

An exemplary embodiment of a power supply apparatus with cable voltage drop compensation of the disclosure is used to supply power to an external load. The power supply apparatus includes a first power pin, a second power pin, a direct current (DC) output regulator, a current sensing circuit and a compensation circuit. The first power pin is coupled to a first power contact of the external load through a first wire. The second power pin is coupled to a second power contact of the external load through a second wire. The DC output regulator receives an input voltage and a feedback voltage and accordingly generates an output voltage and an output current. The current sensing circuit is coupled between an output voltage terminal of the DC output regulator and the first power pin for sensing the output current, or coupled between a reference voltage terminal of the DC output regulator and the second power pin for sensing the output current, so as to accordingly generate a sensing voltage. The compensation circuit is coupled to the current sensing circuit so as to receive the sensing voltage. The compensation circuit is coupled between the first power pin and the second power pin, or coupled between the output voltage terminal of the DC output regulator and the reference voltage terminal of the DC output regulator so as to generate the feedback voltage. The compensation circuit generates a compensation voltage responding to the sensing voltage, and uses the compensation voltage to compensate the output voltage. The compensation voltage is a sum of a voltage drop of the first wire and a voltage drop of the second wire.

Based on the above, in the above embodiments of the disclosure, the output current (namely the load current provided to the external load) of the power supply apparatus may be detected through a current sensor. When the output current increases, the current value of the set current in the compensation circuit also increases with a certain proportion, such that the voltage value of the compensation voltage generated by the compensation circuit also increases. In this way, even if the output current changes such that the voltage drop of the first wire and the voltage drop of the second wire changes, the compensation circuit still may generate the compensation voltage of a corresponding size, so as to dynamically compensate the output voltage, such that the load voltage is maintained at a stable voltage value. Therefore, when the power supply apparatus is under high load, the stability of the load voltage may be enhanced effectively, and the problem of the load terminal where the load voltage instantly drops due to a momentary sharp increase in load may be improved. In addition, the power supply apparatus of the above embodiments of the disclosure does not require an additional sensing wire for detecting the load terminal voltage, therefore the reliability of the wire of the power supply apparatus may be increased and the cost and size of the wire may be reduced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
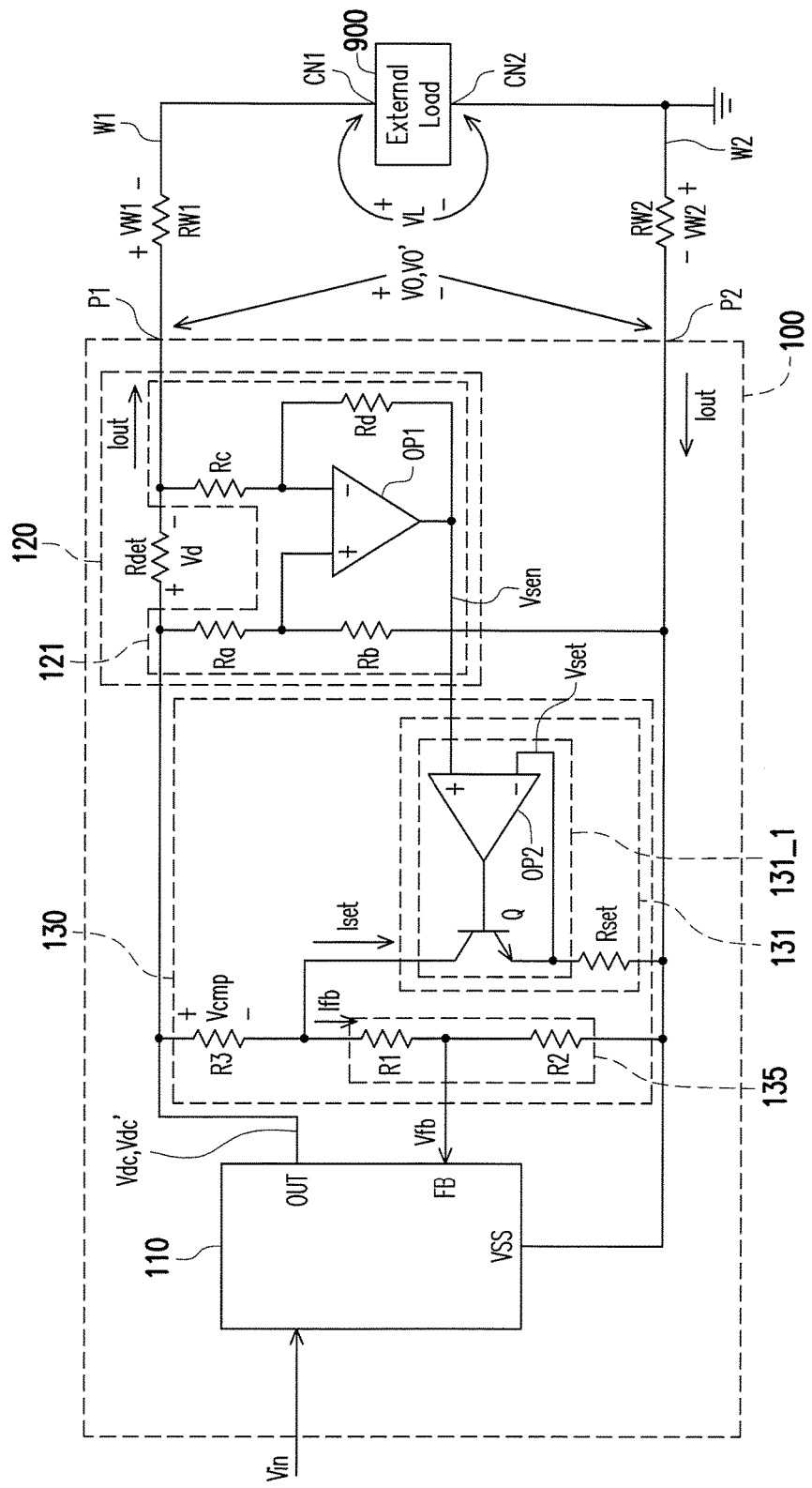
FIG. 1 illustrates a power supply apparatus with cable voltage drop compensation according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Referring to FIG. 1, FIG. 1 illustrates a power supply apparatus 100 with cable voltage drop compensation according to an embodiment of the disclosure. As shown in FIG. 1, the power supply apparatus 100 may supply power to an external load 900. The external load 900 may be, for example, a cell phone, a tablet PC, a notebook computer, a portable power supply and such electronic device, however the disclosure is not limited thereto. The power supply apparatus 100 may include a first power pin P1, a second power pin P2, a direct current (DC) output regulator 110, a current sensing circuit 120 and a compensation circuit 130, however the disclosure is not limited thereto. The first power pin P1 and the second power pin P2 may have different voltage polarities.

The first power pin P1 may be coupled to a first power contact CN1 of the external load 900 through a first wire W1. The second power pin P2 may be coupled to a second power contact CN2 of the external load 900 through a second wire W2. The first power contact CN1 and the second power contact CN2 may have different voltage polarities. The first wire W1 may have a first resistor RW1, and the second wire W2 may have a second resistor RW2. The DC output regulator 110 may be used to receive an input voltage Vin and a feedback voltage Vfb, and generates a DC voltage Vdc (namely, an output voltage VO) and an output current Tout, wherein the input voltage Vin may be a DC power source or an AC power source.

When the output current Tout outputted by the power supply apparatus 100 passes through the first wire W1, the external load 900 and the second wire W2 and flows back to the power supply apparatus 100, a voltage drop VW1 is generated on the first wire W1, and a voltage drop VW2 is generated on the second wire W2, wherein a value of the voltage drops VW1, VW2 are proportional to the output current Iout. Therefore, a load voltage VL between the first power contact CN1 and the second power contact CN2 of the external load 900 will be lower than the output voltage VO between the first power pin P1 and the second power pin P2, and the load voltage VL will change along with the size of the current of the output current Iout.

In order to allow the load voltage VL to maintain stability under all circumstances of current values of the output current Iout, in the present embodiment, a reference voltage terminal VSS of the DC output regulator 110 may be directly coupled to the second power pin P2. The current sensing circuit 120 may be coupled between an output voltage terminal OUT of the DC output regulator 110 and the first power pin P1 so as to sense the output current Iout, and generates a sensing voltage Vsen. The compensation circuit 130 may be coupled to the current sensing circuit 120 so as to receive the sensing voltage Vsen. In addition, the compensation circuit 130 may be coupled between the output voltage terminal OUT of the DC output regulator 110 and the reference voltage terminal VSS of the DC output regulator 110, so as to generate the feedback voltage Vfb. The output voltage terminal OUT and the reference voltage terminal VSS of the DC output regulator 110 may have different voltage polarities. In particular, the compensation circuit 130 may generate a compensation voltage Vcmp responding to the sensing voltage Vsen, so as to compensate the output voltage VO between the first power pin P1 and the second power pin P2, wherein the compensation voltage Vcmp is a sum of the voltage drop VW1 of the first wire W1 and the voltage drop VW2 of the second wire W2.

Figure 2:
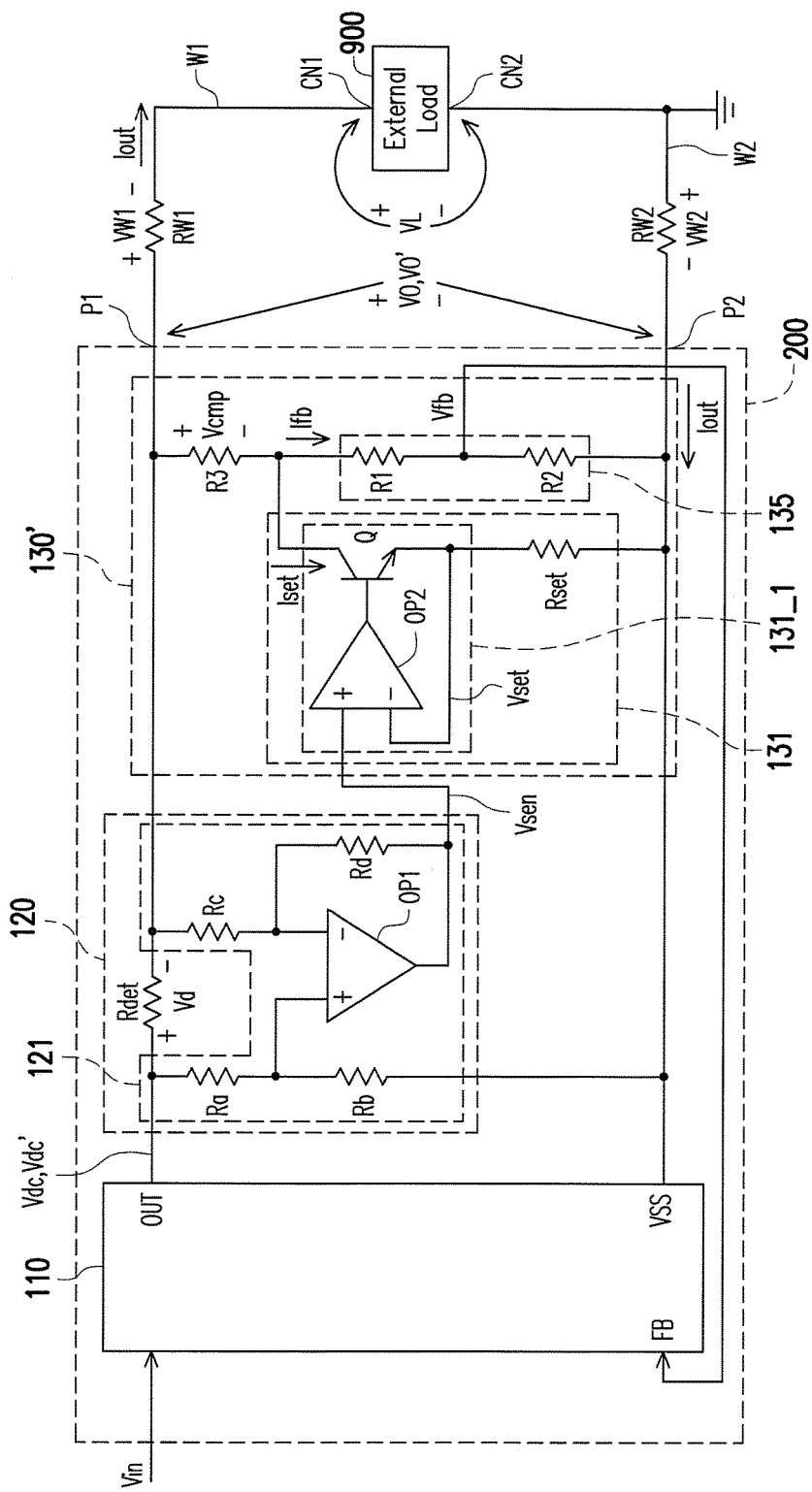
FIG. 2 illustrates a power supply apparatus with cable voltage drop compensation according to another embodiment of the disclosure.

In an embodiment of the disclosure, as shown in FIG. 2, the current sensing circuit 120 may includes a detect resistor Rdet and a subtractor 121, however the disclosure is not limited thereto. The detect resistor Rdet may be coupled between an output voltage terminal OUT of the DC output regulator 110 and the first power pin P1 so as to detect the output current Iout. The subtractor 121 may be coupled to the two terminals of the detect resistor Rdet, so as to perform subtraction operations on the voltages of the two terminals of the detect resistor Rdet (for example, a voltage difference Vd, as shown in FIG. 2), and generates the sensing voltage Vsen.

The subtractor 121 may include an operational amplifier (op-amp) OP1, a first resistor Ra, a second resistor Rb, a third resistor Rc and a fourth resistor Rd, however the disclosure is not limited thereto. An output terminal of the op-amp OP1 is used to generate the sensing voltage Vsen. The first resistor Ra is coupled between an output voltage terminal OUT of the DC output regulator 110 and a non-inverting input terminal of the op-amp OP1. The second resistor Rb is coupled between the non-inverting input terminal of the op-amp OP1 and the second power pin P2. The third resistor Rc is coupled between the first power pin P1 and the inverting input terminal of the op-amp OP1. The fourth resistor Rd is coupled between the inverting input terminal of the op-amp OP1 and an output terminal of the op-amp OP1.

On the other hand, the compensation circuit 130 may include a voltage-to-current converter 131, a compensation resistor R3 and a voltage divider circuit 135. An input terminal of the voltage-to-current converter 131 is coupled to the current sensing circuit 120, so as to receive the sensing voltage Vsen, and generates a set current Iset. The compensation resistor R3 is coupled between the output voltage terminal OUT of the DC output regulator 110 and an output terminal of the voltage-to-current converter 131. The compensation resistor R3 is used to generate the compensation voltage Vcmp responding to the set current Iset. The voltage divider circuit 135 may be coupled between the output terminal of the voltage-to-current converter 131 and the reference voltage terminal VSS of the DC output regulator 110, so as to generate the feedback voltage Vfb.

The voltage-to-current converter 131 may include a voltage follower 131_1 and a set resistor Rset, however the disclosure is not limited thereto. A first input terminal of the voltage follower 131_1 may be used to receive the sensing voltage Vsen, so as to act as a set voltage Vset. An output terminal of the voltage follower 131_1 may be coupled to the output terminal of the voltage-to-current converter 131. The set resistor Rset may be coupled between a second input terminal of the voltage follower 131_1 and the reference voltage terminal VSS of the DC output regulator 110, and may be used to generate the set current Iset responding to the set voltage Vset.

The voltage follower 131_1 may include an op-amp OP2 and a transistor Q, wherein the transistor Q may be a bipolar junction transistor (BJT) or a metal oxide semiconductor field effect transistor (MOSFET), however it should not be construed as a limitation to the disclosure. A non-inverting input terminal of the op-amp OP2 is coupled to the first input terminal of the voltage follower 131_1. An inverting input terminal of the op-amp OP2 is coupled to the second input terminal of the voltage follower 131_1. A control terminal of the transistor Q is coupled to an output terminal of the op-amp OP2. A first terminal of the transistor Q is coupled to the output terminal of the voltage follower 131_1. A second terminal of the transistor Q is coupled to the inverting input terminal of the op-amp OP2.

The voltage divider circuit 135 may include a first resistor R1 and a second resistor R2. The first resistor R1 is coupled between the output terminal of the voltage-to-current converter 131 and a feedback terminal FB of the DC output regulator 110. The second resistor R2 is coupled between the feedback terminal FB of the DC output regulator 110 and the reference voltage terminal VSS of the DC output regulator 110.

An operation of the power supply apparatus 100 shown in FIG. 1 will be described below. For convenience, in the embodiments below, it is assumed that a resistance value of the first resistor Ra, the second resistor Rb, the third resistor Rc and the fourth resistor Rd in the subtractor 121 are all the same, and a resistance value of the first resistor R1 and the second resistor R2 of the voltage divider circuit 135 are substantially greater than the resistance value of the set resistance Rset, therefore a current Ifb flowing into the voltage divider circuit 135 may be negligible, however it should not be construed as a limitation to the disclosure. Under the circumstance, the sensing voltage Vsen generated by the current sensing circuit 120 is equal to the voltage difference Vd of the two terminals of the detection resistor Rdet. In addition, according to the negative feedback characteristics of the voltage follower 131_1, therefore the set voltage Vset is actually equal to the sensing voltage Vsen. Therefore, the set current Iset may be represented as shown in formula (1), the set voltage Vset may be represented as shown in formula (2), and the compensation voltage may be represented as shown in formula (3).

$$Iset=Vset \div Rset \quad \text{formula (1)}$$

$$Vset=Vsen=Vd=Iout \times Rdet \quad \text{formula (2)}$$

$$Vcmp=Iset \times R3 \quad \text{formula (3)}$$

If formula (1) and formula (2) are substituted in formula (3), then the compensation voltage Vcmp may be represented as shown in formula (4).

$$Vcmp=Iout \times ((Rdet \times R3) \div Rset) \quad \text{formula (4)}$$

When the external load 900 does not consume power, namely when the output current Iout is zero, the voltage difference Vd of the two terminals of the detection resistor Rdet is zero, such that the set voltage Vset is zero, therefore the set current Iset is zero. At this time, the compensation voltage Vcmp will not be generated on the compensation resistor R3. In addition, the voltage drop VW1 of the first wire W1 and the voltage drop VW2 of the second wire W2 are all zero (due to the output current Tout is zero), therefore, the load voltage VL will be equal to the output voltage VO, namely the DC voltage Vdc generated by the DC output regulator 110, as shown in formula (5).

$$VL=VO=Vdc=(1+((R1+R3) \div R2)) \times Vfb \quad \text{formula (5)}$$

On the other hand, when the external load 900 consumes power due to operation, namely when the output current Iout is greater than zero, according to formula (4), the compensation voltage Vcmp generated on the compensation resistor R3 will not be zero. At this time, a compensated DC voltage Vdc' of the DC output regulator 110 may be represented as shown in formula (6), and a compensated output voltage VO' of the DC output regulator 110 may be represented as shown in formula (7).

$$Vdc'=(1+((R1+R3) \div R2)) \times Vfb+Vcmp \quad \text{formula (6)}$$

$$VO'=Vdc'-Vd \quad \text{formula (7)}$$

In addition, the voltage drop VW1 of the first wire W1 and the voltage drop VW2 of the second wire W2 may be represented as shown in formula (8) and formula (9) respectively. In order to allow the load voltage VL to maintain stability, namely no matter how the size of the current of the output current Tout changes, the load voltage VL may all be stabilized by $((1+((R1+R3) \div R2)) \times Vfb)$ (namely, the voltage value of the load voltage when the output current Tout is zero), therefore formula (10) may hold. Formula (11) may be obtained by substituting formulas (6) and (7) into formula (10). Formula (12) may be obtained by substituting formulas (4), (8) (9) and the voltage difference Vd=Iout×Rdet into formula (11).

$$VW1=Iout \times RW1 \quad \text{formula (8)}$$

$$VW2=Iout \times RW2 \quad \text{formula (9)}$$

$$VL=VO'-VW1-VW2=((1+((R1+R3) \div R2)) \times Vfb) \quad \text{formula (10)}$$

$$Vcmp-Vd=VW1+VW2 \quad \text{formula (11)}$$

$$((Rdet \times R3) \div Rset)-Rdet=RW1+RW2 \quad \text{formula (12)}$$

In this way, a corresponding compensation voltage Vcmp may be generated to compensate the output voltage VO, such that the load voltage VL remains stable, by measuring a resistance value of the resistor RW1 of the first wire W1 and the resistor RW2 of the second wire W2, and through adjusting a resistance value of the detection resistance Rdet, the compensation resistance R3 and the set resistance Rset so as to satisfy conditions of formula (12).

For example, in the above embodiments, assuming the DC output regulator 110 may be used to generate the DC voltage Vdc of 5 volts, the resistance value of the resistor RW1 of the first wire W1 is 0.2 ohms (Ω), and the resistance value of the resistor RW2 of the second wire W2 is 0.2 ohms (Ω). To satisfy formula (12), the resistance value of the detection resistor Rdet is 0.01 ohms, the resistance value of the set resistor Rset may be 2.5 kilo ohm (KΩ), and the resistance value of the compensation resistor R3 may be 102.5 kilo ohm, however it should not be construed as a limitation to the disclosure.

When the external load 900 does not consume power, namely when the output current Iout is 0 amperes, the voltage difference Vd of the two terminals of the detection resistor Rdet is 0 volts, therefore the set current Iset is 0 amperes. At this time, the compensation voltage Vcmp will not be generated on the compensation resistor R3. In addition, the voltage drop VW1 of the first wire W1 and the voltage drop VW2 of the second wire W2 are all 0 volts, therefore, the load voltage VL is equal to the output voltage VO, and also equal to the DC voltage Vdc generated by the DC output regulator 110 (namely, 5 volts).

On the other hand, when the external load 900 consumes power due to operation, assuming here the output current Iout is 1 amperes, then the voltage drop VW1 of the first wire W1 and the voltage drop VW2 of the second wire W2 are all 0.2 volts, and the voltage difference Vd of the two terminals of the detection resistor Rdet, the sensing voltage Vsen and the set voltage Vset are all 0.01 volts. In this way, the transistor Q will be turned on and the set current Iset is 0.004 milliamperes (mA). At this time, a compensation voltage Vcmp of 0.41 volts is generated on the compensation resistor R3 due to the flow of the set current Iset (0.004 milliamperes). At this time, the DC voltage Vdc of the DC output regulator 110 is pulled high (or compensated) to 5.41 volts due to the compensation voltage Vcmp of 0.41 volts. Because the voltage difference Vd of the two terminals of the detection resistor Rdet is 0.01 volts, therefore the compensated output voltage VO' is 5.4 volts. Under the circumstance where the voltage drop VW1 of the first wire W1 and the voltage drop VW2 of the second wire W2 (all 0.2 volts) are deducted from the compensated output voltage VO', the load voltage VL is still 5 volts.

It is worth to note, because the voltage drop Vd of the two terminals of the detection resistor Rdet is typically very small, therefore the voltage drop Vd in formula (7) and formula (11) generally may be negligible. Therefore, the compensation voltage Vcmp in actuality may be viewed as the sum of the voltage drop VW1 of the first wire W1 and the voltage drop VW2 of the second wire W2.

In this way, when the output current Iout (namely, a load current provided to the external load 900) detected by the detection resistor Rdet increases, the current value of the set current Iset also increases with a certain proportion (according to formula (1) and (2)), such that the voltage value of the compensation voltage Vcmp also increases so as to compensate the output voltage VO. In this way, the compensated output voltage VO' may make the load voltage VL unaffected by influence of the voltage drop VW1 of the first wire and the voltage drop VW2 of the second wire W2 (namely the influence of the output current Iout) and maintain a stable voltage value.

Differing from the previous exemplary embodiment, FIG. 2 illustrates a power supply apparatus 200 with cable voltage drop compensation according to another embodiment of the disclosure. Referring to FIG. 1 and FIG. 2, the power supply apparatus 200 shown in FIG. 2 similarly may include a first power pin P1, a second power pin P2, a DC output regulator 110, a current sensing circuit 120 and a compensation circuit 130'. A circuit structure of the DC output regulator 110, the current sensing circuit 120 and the compensation circuit 130' shown in FIG. 2 are similar to a circuit structure of the DC output regulator 110, the current sensing circuit 120 and the compensation circuit 130 shown in FIG. 1 respectively, therefore reference may be made to the above mentioned FIG. 1 for the relevant description and will not be repeated here.

Compared with FIG. 1 where the compensation circuit 130 is coupled between the output voltage terminal OUT of the DC output regulator 110 and the reference voltage terminal VSS of the DC output regulator 110, the compensation circuit 130' shown in FIG. 2 is coupled between the first power pin P1 and the second power pin P2. In other words, the compensation voltage Vcmp generated by the compensation circuit 130 of FIG. 1 is directly compensated on the DC voltage Vdc generated by the DC output regulator 110, thereby indirectly compensating the output voltage VO (as shown in formula (7)). Opposing to this, the compensation voltage Vcmp generated by the compensation circuit 130' of FIG. 2 directly compensates the output voltage VO.

An operation of the power supply apparatus 200 shown in FIG. 2 will be described below. For convenience, in the embodiments below, similarly it is assumed that a resistance value of the first resistor Ra, the second resistor Rb, the third resistor Rc and the fourth resistor Rd in the subtractor 121 are all the same, and a resistance value of the first resistor R1 and the second resistor R2 of the voltage divider circuit 135 are substantially greater than the resistance value of the set resistance Rset, therefore a current Ifb flowing into the voltage divider circuit 135 may be negligible, however it should not be construed as a limitation to the disclosure. Under the circumstance, the sensing voltage Vsen generated by the current sensing circuit 120 is equal to the voltage difference Vd of the two terminals of the detection resistor Rdet. In addition, according to the negative feedback characteristics of the voltage follower 131_1, therefore the set voltage Vset is actually equal to the sensing voltage Vsen. Therefore, the set current Iset may be represented as shown in formula (1), the set voltage Vset may be represented as shown in formula (2), and the compensation voltage may be represented as shown in formula (3).

When the external load 900 does not consume power, namely when the output current Tout is zero, the voltage difference Vd of the two terminals of the detection resistor Rdet is zero, such that the set voltage Vset is zero, therefore the set current Iset is zero. At this time, the compensation voltage Vcmp will not be generated on the compensation resistor R3. In addition, the voltage drop VW1 of the first wire W1 and the voltage drop VW2 of the second wire W2 are all zero (due to the output current Tout is zero), therefore, the load voltage VL will be equal to the output voltage VO, and also equals to the DC voltage Vdc generated by the DC output regulator 110, as shown in formula (5). In other words, at this time the DC voltage Vdc generated by the DC output regulator 110 is namely the output voltage VO and the load voltage VL.

On the other hand, when the external load 900 consumes power due to operation, namely when the output current Tout is greater than zero, according to formula (4), the compensation voltage Vcmp generated on the compensation resistor R3 will not be zero. At this time, the compensated output voltage VO' then is represented by formula (13).

$$VO'=(1+((R1+R3) \div R2)) \times Vfb + Vcmp \qquad \text{formula (13)}$$

In addition, the voltage drop VW1 of the first wire W1 and the voltage drop VW2 of the second wire W2 may be represented as shown in formula (8) and formula (9) respectively. In order to allow the load voltage VL to maintain stability, namely no matter how the size of the current of the output current Iout changes, the load voltage VL may all be stabilized by $((1+((R1+R3) \div R2)) \times Vfb)$ (namely, the voltage value of the load voltage when the output current Iout is zero), therefore formula (10) may hold. Formula (14) may be obtained by substituting formulas (13) into formula (10). Formula (15) may be obtained by substituting formulas (4), (8) and (9) into formula (14).

$$Vcmp = VW1 + VW2 \qquad \text{formula (14)}$$

$$((Rdet \times R3) \div Rset) = RW1 + RW2 \qquad \text{formula (15)}$$

In this way, a corresponding compensation voltage Vcmp may be generated to compensate the output voltage VO, such that the load voltage VL remains stable, by measuring a resistance value of the resistor RW1 of the first wire W1 and the resistor RW2 of the second wire W2, and through adjusting a resistance value of the detection resistance Rdet, the compensation resistance R3 and the set resistance Rset so as to satisfy conditions of formula (15), It is worth to note, because the voltage drop Vd of the two terminals of the detection resistor Rdet is typically very small, therefore the voltage drop Vd in formula (7) generally may be negligible. Therefore, the compensated DC voltage Vdc' in actuality may be viewed as the compensated output voltage VO'.

For example, in the above embodiments, assuming the DC output regulator 110 may be used to generate the DC voltage Vdc of 5 volts, the resistance value of the resistor RW1 of the first wire W1 is 0.2 ohms (Ω), and the resistance value of the resistor RW2 of the second wire W2 is 0.2 ohms (Ω). To satisfy formula (15), the resistance value of the detection resistor Rdet is 0.01 ohms, the resistance value of the set resistor Rset may be 2.5 kilo ohm (KΩ), and the resistance value of the compensation resistor R3 may be 100 kilo ohm, however it should not be construed as a limitation to the disclosure.

When the external load 900 does not consume power, namely when the output current Tout is 0 amperes, the voltage difference Vd of the two terminals of the detection resistor Rdet is 0 volts, therefore the set current Iset is 0 amperes. At this time, the compensation voltage Vcmp will not be generated on the compensation resistor R3. In addition, the voltage drop VW1 of the first wire W1 and the voltage drop VW2 of the second wire W2 are all 0 volts, therefore, the load voltage VL is equal to the output voltage VO, and namely is the DC voltage Vdc generated by the DC output regulator 110 (5 volts).

On the other hand, when the external load 900 consumes power due to operation, assuming here the output current Tout is 1 amperes, then the voltage drop VW1 of the first wire W1 and the voltage drop VW2 of the second wire W2 are all 0.2 volts, and the voltage difference Vd of the two terminals of the detection resistor Rdet, the sensing voltage Vsen and the set voltage Vset are all 0.01 volts. In this way, the transistor Q will be turned on and the set current Iset is 0.004 milliamperes (mA). At this time, a compensation voltage Vcmp of 0.4 volts is generated on the compensation resistor R3 due to the flow of the set current Iset (0.004 milli amperes). At this time, the output voltage VO is pulled high (or compensated) to 5.4 volts due to the compensation voltage Vcmp of 0.4 volts. Under the circumstance where the voltage drop VW1 of the first wire W1 and the voltage drop VW2 of the second wire W2 (all 0.2 volts) are deducted from the compensated output voltage VO', the load voltage VL is still 5 volts.

In this way, when the output current Iout (namely, a load current provided tot he external load 900) detected by the detection resistor Rdet increases, the current value of the set current Iset also increases with a certain proportion (according to formula (1) and (2)), such that the voltage value of the compensation voltage Vcmp also increases so as to compensate the output voltage VO. In this way, the compensated output voltage VO' may make the load voltage VL unaffected by influence of the voltage drop VW1 of the first wire and the voltage drop VW2 of the second wire W2 (namely the influence of the output current Tout) and maintain a stable voltage value.

Figure 3:
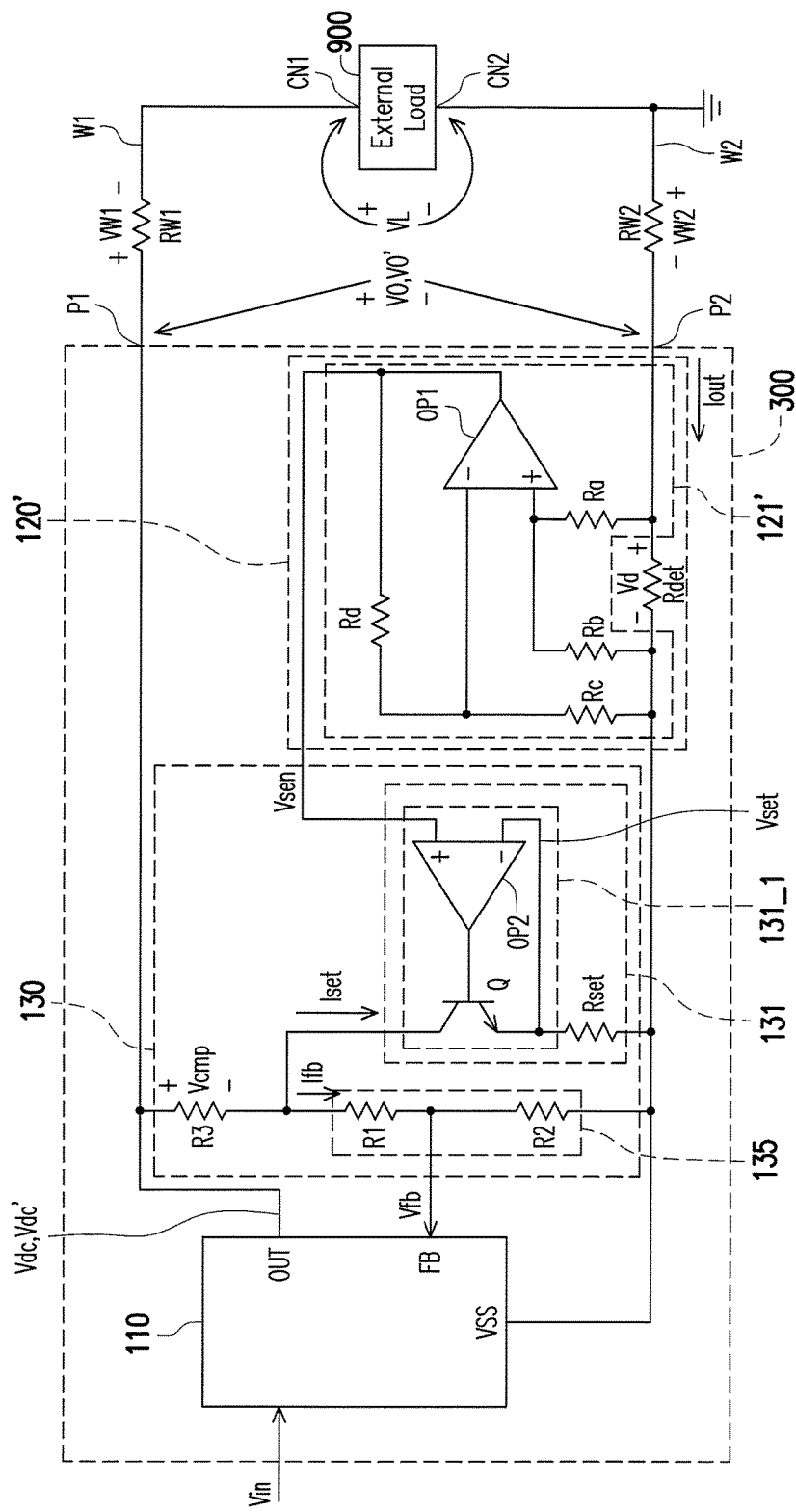
FIG. 3 illustrates a power supply apparatus with cable voltage drop compensation according to another embodiment of the disclosure.

Differing from the embodiment shown in FIG. 1, FIG. 3 illustrates a power supply apparatus 300 with cable voltage drop compensation according to another embodiment of the disclosure. Referring to FIG. 1 and FIG. 3, the power supply apparatus 300 shown in FIG. 3 similarly may include a first power pin P1, a second power pin P2, a DC output regulator 110, a current sensing circuit 120' and a compensation circuit 130. A circuit structure of the DC output regulator 110, the current sensing circuit 120' and the compensation circuit 130 shown in FIG. 3 are similar to a circuit structure of the DC output regulator 110, the current sensing circuit 120 and the compensation circuit 130 shown in FIG. 1 respectively, therefore reference may be made to the above mentioned FIG. 1 for the relevant description and will not be repeated here.

The difference between the power supply apparatus 100 shown in FIG. 1 and the power supply apparatus 300 shown in FIG. 3 lies in: the current sensing circuit 120 shown in FIG. 1 is coupled between an output voltage terminal OUT of the DC output regulator 110 and the first power pin P1 so as to sense the output current Iout and generates a sensing voltage Vsen, and the reference voltage terminal VSS of the DC output regulator 110 is coupled to the second power pin P2. The current sensing circuit 120' shown in FIG. 3 then is coupled between the reference voltage terminal VSS of the DC output regulator 110 and the second power pin P2, so as to sense the output current Tout and generates a sensing voltage Vsen, and the output voltage terminal OUT of the DC output regulator 110 then is coupled to the first power pin P1. However, the operation of the power supply apparatus 300 shown in FIG. 3 is similar to the operation of the power supply apparatus 100 shown in FIG. 1. Therefore, reference may be made to the relevant description of the above mentioned FIG. 1 for the operation of the power supply apparatus 300 shown in FIG. 3 and will not be repeated here.

Figure 4:
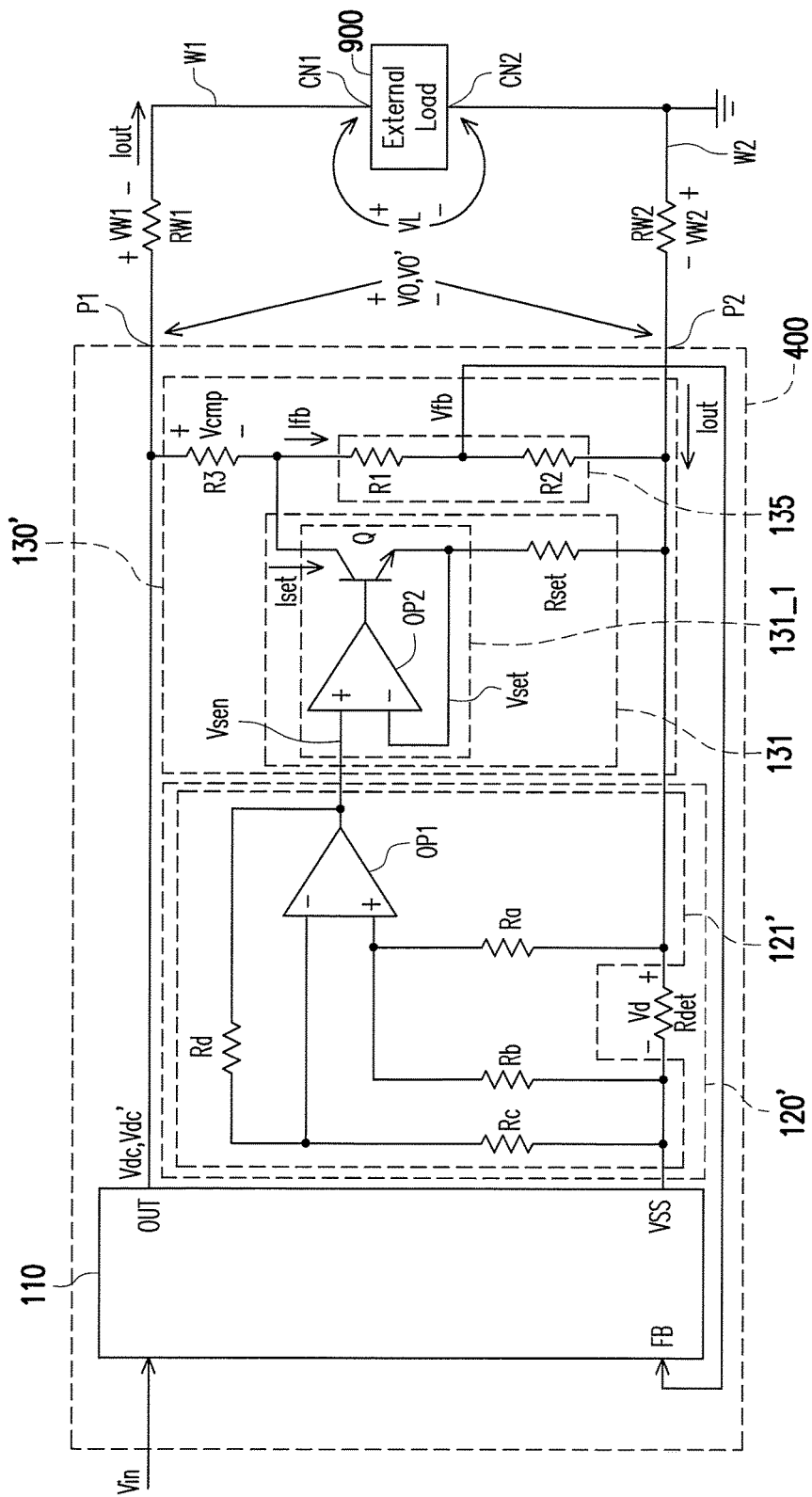
FIG. 4 illustrates a power supply apparatus with cable voltage drop compensation according to another embodiment of the disclosure.

Referring to FIG. 4, FIG. 4 illustrates a power supply apparatus 400 with cable voltage drop compensation according to another embodiment of the disclosure. Referring to FIG. 2 and FIG. 4, the power supply apparatus 400 shown in FIG. 4 similarly may include a first power pin P1, a second power pin P2, a DC output regulator 110, a current sensing circuit 120' and a compensation circuit 130'. A circuit structure of the DC output regulator 110, the current sensing circuit 120' and the compensation circuit 130' shown in FIG. 4 are similar to a circuit structure of the DC output regulator 110, the current sensing circuit 120 and the compensation circuit 130' shown in FIG. 2 respectively, therefore reference may be made to the above mentioned FIG. 1 for the relevant description and will not be repeated here.

The difference between the power supply apparatus 200 shown in FIG. 2 and the power supply apparatus 400 shown in FIG. 4 lies in: the current sensing circuit 120 shown in FIG. 2 is coupled between an output voltage terminal OUT of the DC output regulator 110 and the first power pin P1 so as to sense the output current Iout and generates a sensing voltage Vsen, and the reference voltage terminal VSS of the DC output regulator 110 is coupled to the second power pin P2. The current sensing circuit 120' shown in FIG. 4 then is coupled between the reference voltage terminal VSS of the DC output regulator 110 and the second power pin P2, so as to sense the output current Iout and generates a sensing voltage Vsen, and the output voltage terminal OUT of the DC output regulator 110 then is coupled to the first power pin P1. However, the operation of the power supply apparatus 400 shown in FIG. 4 is similar to the operation of the power supply apparatus 200 shown in FIG. 2. Therefore, reference may be made to the relevant description of the above mentioned FIG. 2 for the operation of the power supply apparatus 400 shown in FIG. 4 and will not be repeated here.

In summary, in the above embodiments of the disclosure, the output current (namely the load current provided to the external load) may be detected through a current sensor. When the output current increases, the current value of the set current in the compensation circuit also increases with a certain proportion, such that the voltage value of the compensation voltage generated by the compensation circuit also increases. In this way, even if the output current changes such that the voltage drop of the first wire and the voltage drop of the second wire changes, the compensation circuit still may generate the compensation voltage of a corresponding size, so as to compensate the output voltage, such that the load voltage is maintained at a stable voltage value. Therefore, when the power supply apparatus is under high load, the stability of the load voltage of the external load may be enhanced effectively, and the problem of the load terminal where the load voltage instantly drops due to a momentary sharp increase in load may be improved. In addition, the power supply apparatus of the above embodiments of the disclosure does not require an additional sensing wire for detecting the load terminal voltage, therefore the reliability of the wire of the power supply apparatus may be increased and the cost and size of the wire may be reduced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A power supply apparatus with cable voltage drop compensation, adapted for supplying power to an external load, the power supply apparatus comprising:
    a first power pin, adapted for coupling to a first power contact of the external load through a first wire;
    a second power pin, adapted for coupling to a second power contact of the external load through a second wire;
    a direct current (DC) output regulator, receiving an input voltage and a feedback voltage and accordingly generates an output voltage and an output current;
    a current sensing circuit, coupled between an output voltage terminal of the DC output regulator and the first power pin for sensing the output current, or coupled between a reference voltage terminal of the DC output regulator and the second power pin for sensing the output current, so as to accordingly generate a sensing voltage; and
    a compensation circuit, coupled to the current sensing circuit so as to receive the sensing voltage, and coupled between the first power pin and the second power pin or between the output voltage terminal of the DC output regulator and the reference voltage terminal of the DC output regulator so as to generate the feedback voltage, wherein the compensation circuit generates a compensation voltage responding to the sensing voltage, and uses the compensation voltage to compensate the output voltage, wherein the compensation voltage is a sum of a voltage drop of the first wire and a voltage drop of the second wire,
    wherein the compensation circuit comprises:
        a voltage-to-current converter, an input terminal of the voltage-to-current converter is coupled to the current sensing circuit so as to receive the sensing voltage, and accordingly generates a set current;
        a compensation resistor, coupled between the output voltage terminal of the DC output regulator and an output terminal of the voltage-to-current converter or between the first power pin and the output terminal of the voltage-to-current converter, and used to generate the compensation voltage responding to the set current; and
        a voltage divider circuit, coupled between the output terminal of the voltage-to-current converter and the reference voltage terminal of the DC output regulator or between the output terminal of the voltage-to-current converter and the second power pin, and used to generate the feedback voltage responding to the compensation voltage.

2. The power supply apparatus as claimed in claim 1, wherein the current sensing circuit is coupled between the output voltage terminal of the DC output regulator and the first power pin, and the reference voltage terminal of the DC output regulator is coupled to the second power pin, the current sensing circuit comprises:
    a detection resistor, coupled between the output voltage terminal of the DC output regulator and the first power pin, and used to detect the output current; and
    a subtractor, coupled to two terminals of the detection resistor so as to perform a subtraction operation on voltages of the two terminals of the detection resistor, and accordingly generates the sensing voltage.

3. The power supply apparatus as claimed in claim 2, wherein the subtractor comprises:
    an operational amplifier (op-amp), wherein an output terminal of the op-amp is used to generate the sensing voltage;
    a first resistor, coupled between the output voltage terminal of the DC output regulator and a non-inverting input terminal of the op-amp;
    a second resistor, coupled between the non-inverting input terminal of the op-amp and the second power pin;
    a third resistor, coupled between the first power pin and an inverting input terminal of the op-amp; and
    a fourth resistor, coupled between the inverting input terminal of the op-amp and the output terminal of the op-amp.

4. The power supply apparatus as claimed in claim 1, wherein the voltage-to-current converter comprises:
    a voltage follower, a first input terminal of the voltage follower is used to receive the sensing voltage to act as a set voltage, an output terminal of the voltage follower is coupled to the output terminal of the voltage-to-current converter; and
    a set resistor, coupled between a second input terminal of the voltage follower and the reference voltage terminal of the DC output regulator, and used to generate the set current responding to the set voltage.

5. The power supply apparatus as claimed in claim 4, wherein the voltage follower comprises:
    an operational amplifier (op-amp), a non-inverting input terminal of the op-amp is coupled to the first input terminal of the voltage follower, an inverting input terminal of the op-amp is coupled to the second input terminal of the voltage follower; and
    a transistor, a control terminal of the transistor is coupled to an output terminal of the op-amp, a first terminal of the transistor is coupled to the output terminal of the voltage follower, a second terminal of the transistor is coupled to the inverting input terminal of the op-amp.

6. The power supply apparatus as claimed in claim 1, wherein the voltage divider circuit comprises:
    a first resistor, coupled between the output terminal of the voltage-to-current converter and a feedback terminal of the DC output regulator; and
    a second resistor, coupled between the feedback terminal of the DC output regulator and the reference voltage terminal of the DC output regulator.

7. The power supply apparatus as claimed in claim 1, wherein the voltage-to-current converter comprises:
- a voltage follower, a first input terminal of the voltage follower is used to receive the sensing voltage to act as a set voltage, an output terminal of the voltage follower is coupled to the output terminal of the voltage-to-current converter; and
- a set resistor, coupled between a second input terminal of the voltage follower and the second power pin, and used to generate the set current responding to the set voltage.

8. The power supply apparatus as claimed in claim 7, wherein the voltage follower comprises:
- an operational amplifier (op-amp), a non-inverting input terminal of the op-amp is coupled to the first input terminal of the voltage follower, an inverting input terminal of the op-amp is coupled to the second input terminal of the voltage follower; and
- a transistor, a control terminal of the transistor is coupled to an output terminal of the op-amp, a first terminal of the transistor is coupled to the output terminal of the voltage follower, a second terminal of the transistor is coupled to the inverting input terminal of the op-amp.

9. The power supply apparatus as claimed in claim 1, wherein the voltage divider circuit comprises:
- a first resistor, coupled between the output terminal of the voltage-to-current converter and a feedback terminal of the DC output regulator; and
- a second resistor, coupled between the feedback terminal of the DC output regulator and the second power pin.

10. The power supply apparatus as claimed in claim 1, wherein the current sensing circuit is coupled between the reference voltage terminal of the DC output regulator and the second power pin, and the output voltage terminal of the DC output regulator is coupled to the first power pin, the current sensing circuit comprises:
- a detection resistor, coupled between the reference voltage terminal of the DC output regulator and the second power pin, and used to detect the output current; and
- a subtractor, coupled to two terminals of the detection resistor so as to perform a subtraction operation on voltages of the two terminals of the detection resistor, and accordingly generates the sensing voltage.

11. The power supply apparatus as claimed in claim 10, wherein the subtractor comprises:
- an operational amplifier (op-amp), an output terminal of the op-amp is used to generate the sensing voltage;
- a first resistor, coupled between the second power pin and the non-inverting input terminal of the op-amp;
- a second resistor, coupled between the non-inverting input terminal of the op-amp and the reference voltage terminal of the DC output regulator;
- a third resistor, coupled between the reference voltage terminal of the DC output regulator and an inverting input terminal of the op-amp; and
- a fourth resistor, coupled between the inverting input terminal of the op-amp and the output terminal of the op-amp.

* * * * *